US011052960B2

(12) United States Patent
Chen

(10) Patent No.: US 11,052,960 B2
(45) Date of Patent: Jul. 6, 2021

(54) TRANSPORTATION DEVICE WITH SELECTIVE ENABLING OF FORE-AFT AUTO-BALANCING

(71) Applicant: Shane Chen, Camas, WA (US)

(72) Inventor: Shane Chen, Camas, WA (US)

(*) Notice: Subject to any disclaimer, the term of this patent is extended or adjusted under 35 U.S.C. 154(b) by 87 days.

(21) Appl. No.: 16/283,733

(22) Filed: Feb. 22, 2019

(65) Prior Publication Data
US 2019/0351964 A1 Nov. 21, 2019

Related U.S. Application Data

(60) Provisional application No. 62/634,115, filed on Feb. 22, 2018.

(51) Int. Cl.
B62K 11/00 (2006.01)
B62J 99/00 (2020.01)
B62K 1/00 (2006.01)
B62K 23/08 (2006.01)
B62J 45/40 (2020.01)

(52) U.S. Cl.
CPC ............. *B62K 11/007* (2016.11); *B62J 99/00* (2013.01); *B62K 1/00* (2013.01); *B62K 23/08* (2013.01); *B62J 45/40* (2020.02)

(58) Field of Classification Search
USPC ........................................................ 701/124
See application file for complete search history.

(56) References Cited

U.S. PATENT DOCUMENTS

| 6,288,505 | B1* | 9/2001 | Heinzmann | B62K 11/007 318/139 |
| 6,302,230 | B1* | 10/2001 | Kamen | A63C 17/12 180/171 |
| 8,170,780 | B2* | 5/2012 | Field | G05D 1/0268 701/124 |
| 8,738,278 | B2* | 5/2014 | Chen | B62K 11/007 701/124 |
| 8,807,250 | B2* | 8/2014 | Chen | B62K 11/007 180/21 |
| 9,101,817 | B2* | 8/2015 | Doerksen | G05D 1/0227 |
| 10,010,784 | B1* | 7/2018 | Doerksen | B62K 1/00 |
| 10,315,720 | B2* | 6/2019 | Chen | B62K 1/00 |
| 2005/0121238 | A1* | 6/2005 | Ishii | B60L 15/20 180/65.1 |
| 2011/0191013 | A1* | 8/2011 | Leeser | B62D 11/04 701/124 |
| 2011/0220427 | A1* | 9/2011 | Chen | B62K 1/00 180/21 |
| 2012/0175176 | A1* | 7/2012 | Hamaya | B60L 50/52 180/21 |
| 2016/0121198 | A1* | 5/2016 | Doerksen | A63C 17/01 701/22 |

(Continued)

Primary Examiner — Tyler D Paige

(57) ABSTRACT

A central wheel structure transportation device with fore-aft auto-balancing. The auto-balancing is selectively enabled (and disabled) to improve rider experience, safety and ease of mounting and use. In one embodiment, during mounting, auto-balancing is not enabled until the lateral tilt angle of the device is below a given threshold from vertical. Fore-aft sensors, lateral tilt sensors, foot presence sensors, and/or accelerometers, or the like, may be used in various combinations to affect device operation and performance.

20 Claims, 1 Drawing Sheet

(56) References Cited

U.S. PATENT DOCUMENTS

2016/0159424 A1\* 6/2016 Chen .................... B62K 15/006
                                                              180/208
2016/0325801 A1\* 11/2016 Artemev .............. B60K 7/0007
2016/0339328 A1\* 11/2016 Simeray ................. A63C 17/26
2017/0008593 A1\* 1/2017 Artemev ................. B60L 50/30
2018/0127045 A1\* 5/2018 Artemev ................. B60L 50/66

\* cited by examiner

TRANSPORTATION DEVICE WITH SELECTIVE ENABLING OF FORE-AFT AUTO-BALANCING

CROSS REFERENCE TO RELATED APPLICATIONS

The present application claims the benefit of provisional application No. 62/634,115, filed Feb. 22, 2018, for selective balancing modes for auto-balancing personal transportation devices by the inventor herein.

FIELD OF THE INVENTION

The present invention relates to auto-balancing transportation devices and, more specifically, to strategically enabling and disabling auto-balancing in such devices.

BACKGROUND OF THE INVENTION

The prior art includes several auto-balancing transport devices. These include the Segway, developed by Kamen et al and disclosed in U.S. Pat. No. 6,302,230 (among others) and the Solowheel (U.S. Pat. No. 8,807,250) and Hovertrak (U.S. Pat. No. 8,738,278) by Chen, the inventor herein. These three patents are hereby incorporated by reference as though disclosed in their entirety herein.

The prior art also includes Iota™. Iota is a central wheel structure auto-balancing device, like the SoloWheel. A central wheel structure infers that the wheel structure is between (or central) to two foot platforms, a rider straddling the wheel structure while riding. The wheel structure can be a single wheel (rim and tire) or a single rim with multiple tires, or multiple rims and tires coupled together, or the like.

In Iota, the foot platforms are located relatively close to the ground, compared, for example, to SoloWheel and similar devices. Also, since Iota is fairly low in height, i.e., smaller radius wheel, there may be less vertically ascending structure to contact the lower leg of a rider and thereby enhance stability and control (by providing another point of contact).

Specifically, when mounting Iota, a rider typically places one foot on a foot platform, while the other foot remains on the ground. This tilts the device laterally (to the side). If the ground under the rider is sloped in fore-aft, the foot platform the rider is standing on will likely slope also thereby moving the platform from a neutral pitch angle and causing the auto-balance function to move the device to recover the neutral pitch. Similarly, if the placement of the rider's foot on the platform causes the platform to rock or move out of neutral pitch, the auto-balance function will begin moving the device. Movement of the device in this manner makes mounting, for example, placement of the second foot on its platform, difficult.

A need thus exists to control the enabling of auto-balance based driving when a rider is mounting the device. Needs also exist for better managing the transition from mounting to riding, for detecting and accommodating rider wobble, and for other rider experiences, such as spin, dismounting and related actions.

SUMMARY OF THE INVENTION

Accordingly, it is an object of the present invention to provide an auto-balancing transportation device that overcomes the shortcomings of the prior art.

It is another object of the present invention to provide an auto-balancing transportation device that affords a better mounting and/or use experience for a rider.

It is also an object of the present invention to provide an auto-balancing transportation device that utilizes fore-aft pitch, lateral tilt and/or the presence of a rider's foot or feet to control or influence auto-balance based drive.

These and related objects of the present invention are achieved by use of a transportation device with selective enabling of fore-aft auto-balancing as described herein.

The attainment of the foregoing and related advantages and features of the invention should be more readily apparent to those skilled in the art, after review of the following more detailed description of the invention taken together with the drawings.

DETAILED DESCRIPTION

Figure 1:
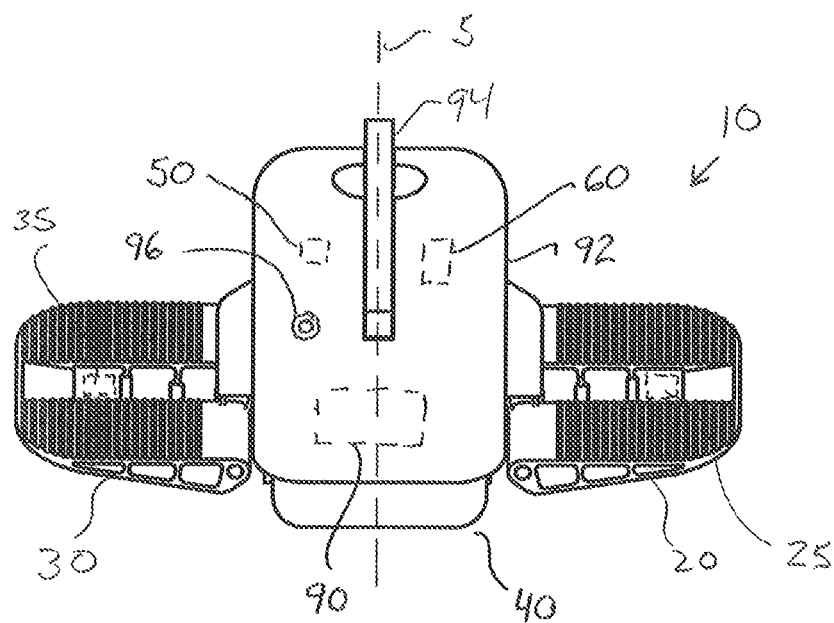
FIGS. 1-2 are a perspective view and an elevation view, respectively, of an auto-balancing device in accordance with the present invention.
Figure 2:
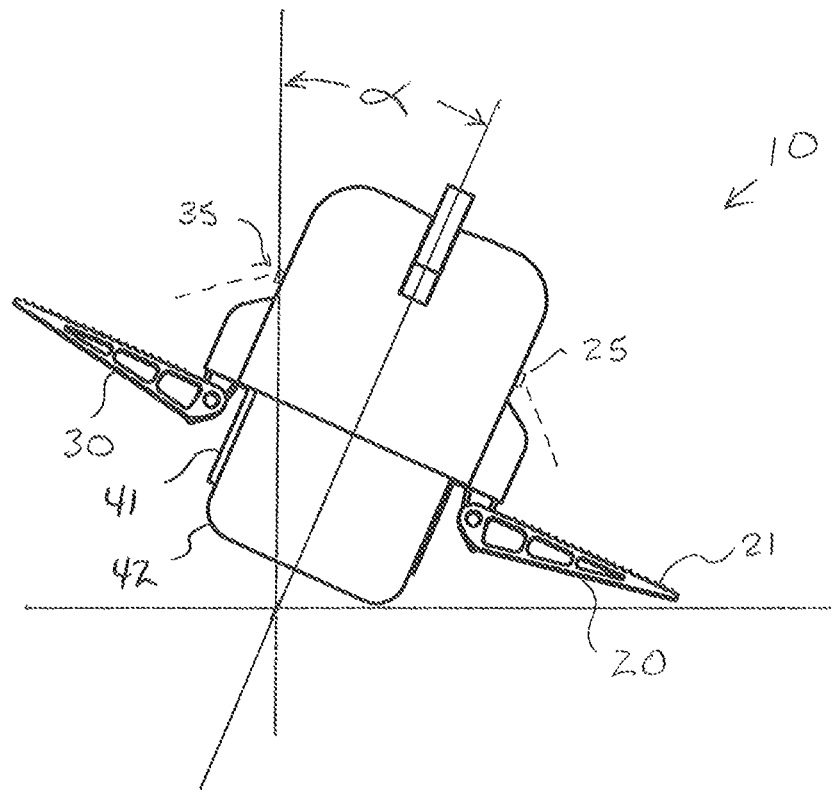

Referring to FIGS. 1-2, a perspective view (from an above angle) and an elevation view (in a laterally tilted position) of an auto-balancing device 10 in accordance with the present invention are shown, respectively.

Device 10 preferably includes two foot platforms 20,30, a wheel structure 40, a motor (interior to the device) that drives wheel structure 40, a position sensor 50 capable of detecting fore-aft pitch angle and lateral tilt angle, a control circuit 60, a battery 90, a housing 92, a handle 94, and an on/off switch 96. The foot platforms preferably fold in when not in use. Device 10 employs auto-balance based control that detects a deviation of the foot platforms from a neutral pitch and drives the wheel structure forward or backward based on the magnitude and direction of the deviation from the neutral pitch. Auto-balancing devices of this type are known in the art and include those mentioned in the Background of the Invention section above, among others.

Wheel structure 40 is preferably centrally located, side-to-side, and in the embodiment of FIG. 1 has a tire 42 coupled to rim 41. Tire 42, in lateral cross-section (top or bottom), may be wider than tall and even 1.5× or 2× or more wider than tall (for example, as shown). While a single wide tire is shown in FIGS. 1-2, two (or more) tires may be provided in wheel structure 40, and in combination they may have a similar width to height ratio (hence enhancing lateral stability).

Position sensor 50 may be a gyroscopic sensor. A gyroscopic sensor can sense fore-aft pitch angle, lateral tilt angle, acceleration and other parameters. A separate fore-aft pitch angle sensor, lateral tilt sensor, accelerometer(s), and the like, may be used without departing from the present invention.

Control circuit 60 may include a microprocessor or other suitable processing device or arrangement.

Device 10 may also include foot presence sensors 25, 35. These sensors may take several forms, including but not limited to pressure that detect the weight of a rider on a given foot platform, or an electro-magnetic radiation based sensors that detects a foot (or a blockage or reflection of EM radiation) at the foot platforms, or other suitable sensors. In FIG. 1, the foot presence sensors are pressure sensors, while in FIG. 2, they are embodied as EM radiation sensors.

FIG. 2 illustrates device 10 as though the far end 21 of platform 20 is touching the ground and preventing the device from tilting further. This is the typical position the device is in at mounting, with a rider placing the weight of one of his or her feet on that platform.

In an upright position, shown in FIG. 1, there is a central vertical plane (CVP) 5 that intersects the device (centrally from side to side) and is disposed longitudinally, perpendicular to the lateral tilt dimension. In FIG. 1, the CVP runs through handle 94.

In FIG. 2, it can be seen that device 10 is tipped laterally relative to the CVP by an angle, a. This is the lateral tilt angle.

The present invention strategically controls auto-balancing and related device function to enhance the rider experience, improve safety and facilitate ease of use.

Various experiences and situations that a rider may encounter (and device function related thereto) are now discussed.

Mounting

At device mounting, a rider typically places one foot on a first foot platform and the other foot on the other foot platform. Since wheel structure 40 is centrally located, stepping on one platform first causes the device to tilt. A user then steps on the other foot platform and the device returns to a laterally upright position.

As discussed above, if auto-balancing is enabled when a user places the first foot on the device, and the ground is sloped in fore-aft, or placement of that foot causes the fore-aft pitch angle to deviate from neutral, then the device will begin to move. Typically, this movement will be rotation as the wheel pivots about the contact point caused by end 21 touching the ground. Movement of the device in this, or any, manner creates a "moving target" for placement of the second foot which, of course, makes mounting additionally difficult.

Accordingly, control circuit 60 is preferably configured to sense the lateral tilt position of the device and not enable auto-balancing (at mounting) until the lateral tilt of the device is less than a threshold value. For example, in FIG. 2, the lateral tilt of the device with a foot on platform 20 (only) may be 15 degrees. When the second foot is placed on its platform, the weight will start to decrease the lateral tilt angle.

Control circuit 60 is preferably configured to enable auto-balancing at a lateral tilt angle that facilitates mounting and, generally, ease of use. In one embodiment, the tilt angle for AB activation is one at which a rider foot has likely been placed (or is being placed) on the other foot platform. In the 15 degrees at rest example above, the less than 15 degrees angle might be 12 or 10 degrees. In this manner, AB is enabled soon after foot contact is made, yet not until the rider has both feet contacting the device and thus can better respond or cause device movement.

If it is desired for the device to be more laterally stable before AB is enabled then the tilt angle for AB activation can be less, such as 5 degrees or still less, etc.

The preferred tilt angle for AB activation may vary without departing from the present invention based on factors such as the dimensions of the device (tire, platform size), rider level and other. It may also be programmable (or selected) by the rider.

Shifting Reference Pitch Angle

If, when auto-balancing is being enabled, the device is not at (or near) a neutral fore-aft pitch angle, then the device may quickly lunge forward or backward as it drives toward neutral pitch. This is destabilizing to a rider.

Thus, control circuit 60 is preferably configured such that at auto-balance enabling, if the device is not at the neutral pitch angle, then the reference pitch angle for auto-balance is set at the pitch angle at activation. The reference pitch angle for auto-balance is then shifted to the neutral pitch angle (over a short period of time).

It should be recognized that a goal is to make smooth (or smoother than in prior art devices) the transition to neutral pitch based auto-balance. It should be noted that the value of the initial reference pitch angle and the speed of the shift to the neutral pitch angle may vary without departing from the present invention.

Lateral Wobble Mode

Lateral wobble refers to lateral instability of a rider on the platform and, more specifically, to rapid and alternating changes in the amount and direction of lateral tilt of the device. Accelerometers can detect these rapid and changing movements. Control circuit 60 is preferably configured such that when the rider displays wobble, that the device is "forgiving" and does not disable auto-balancing even when the lateral tilt angle exceeds a threshold for disabling auto-balancing, in the absence of wobbling. In the example above, if auto-balancing is enabled at 10 degrees (and disable if over 10), then in response to a wobble mode detection, the control circuit would allow auto-balancing to continue even if the threshold for disabling is exceeded.

In other words, the control circuit is preferably configured to sense rapid alternating lateral accelerations and modify the enabling of fore-aft auto-balance, when detected, to give a rider extended opportunity to recover.

Spin

As alluded to above, spin may occur when device 10 moves circularly around the pivot point caused by the foot platform touching the ground. The occurrence of spin can be determined or "guessed" by accelerometers and position sensors. In one embodiment, when the lateral tilt angle exceeds a threshold and the gyroscopic sensor indicates rotational movement, auto-balancing is disable to allow the user to regain lateral balance.

In another embodiment, auto-balancing is not disabled during spin to allow the user to do tight turns and tricks. In yet another embodiment, disabling due to spin or the degree of spin may be adjusted by the rider, for example, through a mobile device app wirelessly coupled to the device, or by an interface on device 10, or other.

Foot Presence Sensors

Various types of foot presence sensors are known in the art. While the lateral tilt angle may be used alone for enabling auto-balance, the determination to enable or disable auto-balancing may be done in concert with foot presence sensors 25, 35. For example, control circuit 60 may be configured to enable auto-balancing when the tilt angle is less than a given threshold and the foot presence sensors detects a foot at both platforms.

In a related determination, auto-balancing may be disabled if the absence of a foot is sensed, and/or if that absence is sensed for a predefined period of time.

In yet another embodiment, control circuit 60 may be configured to turn on auto-balancing when a foot is detected at both foot platforms, regardless of lateral tilt angle. This presence may be indicated by the weight of a rider on the platforms or by a detection of the side of the rider's foot electromagnetically or by other methods.

Dismount

Control circuit 60 may be configured to disable auto-balance when the lateral tilt angle has exceeded a threshold angle. An angle greater than this threshold may suggest that a user has fallen off and is trying to remount, or that the device has crashed and is at an odd angle. The threshold angle for disabling can be the "same" as that for enabling ("same" here may mean 10 or less for enabling and greater than 10 for disabling), or the threshold angles for disabling and enabling may be different, for example, enabling at 10 degrees and disabling at 12 degrees, i.e., once the rider is on the device, the angle for disabling is expanded over that for mounting ease.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. An auto-balancing transportation device, comprising:
   a wheel structure defining a longitudinally-disposed central vertical plane, when in an upright position;
   a first foot platform provided on one lateral side of the wheel structure and a second foot platform provided on the other lateral side of the wheel structure;
   a fore-aft pitch sensor;
   a lateral tilt sensor;
   a motor that drives the wheel structure;
   a control circuit coupled to the fore-aft pitch sensor, the lateral tilt sensor and the motor, that signals the motor to drive the wheel structure towards auto-balancing the device in response to data from the fore-aft pitch sensor;
   wherein the control circuit is configured such that auto-balancing is not enabled until the lateral tilt angle from the central vertical plane is less than a given threshold enable angle.

2. The device of claim 1, wherein the threshold enable angle for enabling auto-balancing is 10 degrees or less.

3. The device of claim 1, wherein the threshold enable angle for enabling auto-balancing is 5 degrees or less.

4. The device of claim 1, wherein the control circuit is configured such that the initial reference pitch angle for auto-balancing is set at the pitch angle of the device when auto-balancing is enabled.

5. The device of claim 4, wherein the control circuit is configured to shift the reference pitch angle for auto-balancing from the initial reference pitch angle to the neutral pitch angle.

6. The device of claim 1, wherein the control circuit is configured to set an initial reference pitch angle that is other than the neutral pitch angle.

7. The device of claim 1, wherein the control circuit is configured to disable auto-balancing when the lateral tilt angle exceeds a threshold disable angle that is different from the threshold enable angle.

8. The device of claim 7, wherein the control circuit is configured to detect the occurrence of rapid, alternating lateral movement of the device and allow auto-balancing at a lateral tilt that exceeds the threshold disable angle when such an occurrence is detected.

9. The device of claim 1, further comprising a first foot presence sensor associated with the first foot platform, and a second foot presence sensor associated with the second foot platform; and wherein the control circuit is coupled to the first and second foot presence sensors and is configured to enable auto-balancing when a foot is sensed at both foot platforms.

10. The device of claim 1, including a tire arrangement at the wheel structure, the tire arrangement having a lateral cross sectional width that is 2 times or more its height at that width.

11. The device of claim 1, wherein the control circuit is configured to detect the occurrence of device spin and disable auto-balancing when such an occurrence is detected.

12. The device of claim 1, wherein the threshold enable angle for enabling auto-balancing is less than 15 degrees.

13. The device of claim 1, wherein the threshold enable angle for enabling auto-balancing is programmable by a rider.

14. The device of claim 1, wherein the wheel structure includes at least two tires.

15. An auto-balancing transportation device, comprising:
   a wheel structure defining a longitudinally-disposed central vertical plane, when in an upright position;
   a first foot platform provided on one lateral side of the wheel structure and a second foot platform provided on the other lateral side of the wheel structure;
   a fore-aft pitch sensor;
   a lateral tilt sensor;
   a motor that drives the wheel structure;
   a control circuit coupled to the fore-aft pitch sensor, the lateral tilt sensor and the motor, that signals the motor to drive the wheel structure towards auto-balancing the device in response to data from the fore-aft pitch sensor;
   wherein the control circuit is configured such that fore-aft auto-balancing is not enabled until the lateral tilt angle from the central vertical plane is less than a given threshold enable angle.

16. The device of claim 15, wherein the threshold enable angle for enabling auto-balancing is less than 15 degrees from vertical.

17. The device of claim 15, wherein the threshold enable angle for enabling auto-balancing is 10 degrees or less.

18. The device of claim 15, wherein the threshold enable angle for enabling auto-balancing is programmable by a rider.

19. An auto-balancing transportation device, comprising:
   a wheel structure defining a longitudinally-disposed central vertical plane, when in an upright position;
   a first foot platform provided on one lateral side of the wheel structure and a second foot platform provided on the other lateral side of the wheel structure;
   a fore-aft pitch sensor;
   a lateral tilt sensor;
   a motor that drives the wheel structure;
   a control circuit coupled to the fore-aft pitch sensor, the lateral tilt sensor and the motor, that signals the motor to drive the wheel structure towards auto-balancing the device in response to data from the fore-aft pitch sensor;
   wherein the control circuit is configured such that fore-aft auto-balancing is not enabled until the lateral tilt angle from the central vertical plane is less than a given threshold enable angle; and
   wherein the threshold enable angle for enabling auto-balancing is less than 15 degrees.

20. The device of claim 19, wherein the threshold enable angle for enabling auto-balancing is 12 degrees or less.

* * * * *